(12) United States Patent
Sinclair

(10) Patent No.: US 7,877,540 B2
(45) Date of Patent: Jan. 25, 2011

(54) LOGICALLY-ADDRESSED FILE STORAGE METHODS

(75) Inventor: Alan Welsh Sinclair, Falkirk (GB)

(73) Assignee: SanDisk Corporation, Milpitas, CA (US)

( * ) Notice: Subject to any disclaimer, the term of this patent is extended or adjusted under 35 U.S.C. 154(b) by 227 days.

(21) Appl. No.: 11/302,764

(22) Filed: Dec. 13, 2005

(65) Prior Publication Data

US 2007/0136555 A1 Jun. 14, 2007

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. ................. 711/103; 711/203; 711/E12.001
(58) Field of Classification Search .................. 711/202, 711/203
See application file for complete search history.

(56) References Cited

U.S. PATENT DOCUMENTS

| | | | |
|---|---|---|---|
| 4,800,520 A | 1/1989 | Iijima | |
| 4,802,117 A | 1/1989 | Chrosny et al. | |
| 5,226,155 A | 7/1993 | Iijima | |
| 5,369,754 A | 11/1994 | Fandrich et al. | |
| 5,388,083 A | 2/1995 | Assar et al. | |
| 5,404,485 A | 4/1995 | Ban | |
| 5,473,761 A | 12/1995 | Parks et al. | 711/4 |
| 5,570,315 A | 10/1996 | Tanaka et al. | |
| 5,592,669 A | 1/1997 | Robinson et al. | |
| 5,602,987 A | 2/1997 | Harari et al. | |
| 5,619,690 A | 4/1997 | Matsunami et al. | |
| 5,634,050 A | 5/1997 | Krueger et al. | |
| 5,754,817 A | 5/1998 | Wells et al. | |
| 5,774,397 A | 6/1998 | Endoh et al. | |
| 5,787,445 A | 7/1998 | Daberko | |
| 5,799,168 A | 8/1998 | Ban | |
| 5,809,558 A | 9/1998 | Matthews et al. | |
| 5,832,493 A | 11/1998 | Marshall et al. | |
| 5,832,526 A * | 11/1998 | Schuyler | 707/205 |
| 5,867,641 A | 2/1999 | Jenett | |

(Continued)

FOREIGN PATENT DOCUMENTS

DE 10234971 A1 2/2004

(Continued)

OTHER PUBLICATIONS

Takeuchi et al. "A 125-mm2 1-Gb NAND Flash Memory With 10-Mbyte/s Program Speed" Nov. 2002. IEEE Journal of Solid-State Circuits, vol. 37, No. 11. pp. 1493-1499.*

(Continued)

*Primary Examiner*—Matt Kim
*Assistant Examiner*—Matthew R Chrzanowski
(74) *Attorney, Agent, or Firm*—Weaver Austin Villeneuve & Sampson LLP

(57) ABSTRACT

Files that are mapped to a logical address range by a host become logically fragmented prior to being sent to a memory system. Subsequently, the logically fragmented portions are reassembled when they are stored in blocks in the memory system. The host supplies information to the memory system regarding file-to-logical mapping of data prior to sending the data. The memory selects storage locations for the data based on the files to which the data belong.

18 Claims, 10 Drawing Sheets

U.S. PATENT DOCUMENTS

| | | | | |
|---|---|---|---|---|
| 5,896,393 | A | 4/1999 | Yard et al. | |
| 5,907,854 | A | 5/1999 | Kerns | |
| 5,928,347 | A | 7/1999 | Jones | |
| 5,933,846 | A | 8/1999 | Endo | |
| 5,937,425 | A | 8/1999 | Ban | |
| 5,966,720 | A | 10/1999 | Itoh et al. | |
| 5,987,478 | A | 11/1999 | See et al. | |
| 6,014,724 | A | 1/2000 | Jenett | |
| 6,021,415 | A | 2/2000 | Cannon et al. | |
| 6,046,935 | A | 4/2000 | Takeuchi et al. | |
| 6,069,827 | A | 5/2000 | Sinclair | |
| 6,081,878 | A | 6/2000 | Estakhri et al. | |
| 6,094,693 | A * | 7/2000 | Haneda | 710/36 |
| 6,148,354 | A | 11/2000 | Ban et al. | |
| 6,216,204 | B1 | 4/2001 | Thiriet | |
| 6,256,690 | B1 | 7/2001 | Carper | |
| 6,275,804 | B1 | 8/2001 | Carl et al. | |
| 6,279,069 | B1 | 8/2001 | Robinson et al. | |
| 6,373,746 | B1 | 4/2002 | Takeuchi et al. | |
| 6,385,690 | B1 | 5/2002 | Iida et al. | |
| 6,412,040 | B2 | 6/2002 | Hasbun et al. | |
| 6,426,893 | B1 | 7/2002 | Conley et al. | |
| 6,446,140 | B1 | 9/2002 | Nozu | |
| 6,456,528 | B1 | 9/2002 | Chen | |
| 6,467,021 | B1 | 10/2002 | Sinclair | |
| 6,480,935 | B1 | 11/2002 | Carper et al. | |
| 6,484,937 | B1 | 11/2002 | Devaux et al. | |
| 6,490,649 | B2 | 12/2002 | Sinclair | |
| 6,502,178 | B1 | 12/2002 | Olbrich | 711/202 |
| 6,522,580 | B2 | 2/2003 | Chen et al. | |
| 6,535,949 | B1 | 3/2003 | Parker | |
| 6,547,150 | B1 | 4/2003 | Deo et al. | |
| 6,567,307 | B1 | 5/2003 | Estakhri | |
| 6,598,114 | B2 | 7/2003 | Funakoshi | |
| 6,604,168 | B2 | 8/2003 | Ogawa | |
| 6,643,188 | B2 | 11/2003 | Tanaka et al. | |
| 6,668,336 | B2 | 12/2003 | Lasser | |
| 6,721,843 | B1 | 4/2004 | Estakhri | |
| 6,763,424 | B2 | 7/2004 | Conley | |
| 6,766,432 | B2 | 7/2004 | Saltz | |
| 6,771,536 | B2 | 8/2004 | Li et al. | |
| 6,772,274 | B1 | 8/2004 | Estakhri | |
| 6,772,955 | B2 | 8/2004 | Yoshimoto et al. | |
| 6,779,063 | B2 | 8/2004 | Yamamoto | |
| 6,781,877 | B2 | 8/2004 | Cernea et al. | |
| 6,865,659 | B2 | 3/2005 | Montemayor | |
| 6,883,114 | B2 | 4/2005 | Lasser | |
| 6,886,083 | B2 | 4/2005 | Murakami | |
| 6,901,457 | B1 | 5/2005 | Toombs et al. | |
| 6,925,007 | B2 | 8/2005 | Harari et al. | |
| 6,928,456 | B2 * | 8/2005 | Sadhasivan et al. | 707/200 |
| 7,035,949 | B2 | 4/2006 | Bychkov et al. | |
| 7,035,993 | B2 | 4/2006 | Tai et al. | |
| 7,057,939 | B2 | 6/2006 | Li et al. | |
| 7,092,911 | B2 | 8/2006 | Yokota et al. | |
| 7,111,085 | B2 | 9/2006 | Estakhri et al. | |
| 7,139,864 | B2 | 11/2006 | Bennett et al. | |
| 2003/0065899 | A1 * | 4/2003 | Gorobets | 711/165 |
| 2003/0109093 | A1 | 6/2003 | Harari et al. | |
| 2003/0147278 | A1 | 8/2003 | Tanaka et al. | |
| 2003/0221103 | A1 * | 11/2003 | Hirota et al. | 713/172 |
| 2003/0229753 | A1 | 12/2003 | Hwang | |
| 2004/0049627 | A1 | 3/2004 | Piau et al. | |
| 2004/0073727 | A1 * | 4/2004 | Moran et al. | 710/74 |
| 2004/0157638 | A1 | 8/2004 | Moran et al. | |
| 2005/0005149 | A1 * | 1/2005 | Hirota et al. | 713/193 |
| 2005/0055532 | A1 | 3/2005 | Yu | |
| 2005/0141312 | A1 | 6/2005 | Sinclair et al. | |
| 2005/0141313 | A1 | 6/2005 | Gorobets et al. | |
| 2005/0144357 | A1 | 6/2005 | Sinclair | |
| 2005/0144358 | A1 | 6/2005 | Conley et al. | |
| 2005/0144360 | A1 | 6/2005 | Bennett et al. | |
| 2005/0144363 | A1 | 6/2005 | Sinclair | |
| 2005/0144365 | A1 | 6/2005 | Gorobets et al. | |
| 2005/0144367 | A1 | 6/2005 | Sinclair | |
| 2005/0144418 | A1 | 6/2005 | Kita | 711/203 |
| 2005/0165853 | A1 * | 7/2005 | Turpin et al. | 707/200 |
| 2005/0166087 | A1 | 7/2005 | Gorobets | |
| 2006/0020744 | A1 | 1/2006 | Sinclair et al. | |
| 2006/0020745 | A1 | 1/2006 | Conley et al. | |
| 2006/0031593 | A1 | 2/2006 | Sinclair | |
| 2006/0129749 | A1 * | 6/2006 | Nakanishi et al. | 711/103 |
| 2006/0155920 | A1 | 7/2006 | Smith et al. | |
| 2006/0155921 | A1 | 7/2006 | Gorobets et al. | |
| 2006/0155922 | A1 | 7/2006 | Gorobets et al. | |
| 2006/0161728 | A1 | 7/2006 | Bennett et al. | |
| 2006/0168395 | A1 | 7/2006 | Deng et al. | |
| 2006/0184718 | A1 | 8/2006 | Sinclair et al. | |
| 2006/0184719 | A1 | 8/2006 | Sinclair | |
| 2006/0184720 | A1 | 8/2006 | Sinclair et al. | |
| 2006/0184722 | A1 | 8/2006 | Sinclair | |
| 2006/0184723 | A1 | 8/2006 | Sinclair et al. | |
| 2007/0033323 | A1 | 2/2007 | Gorobets | 711/103 |
| 2007/0033324 | A1 | 2/2007 | Sinclair | 711/103 |
| 2007/0136553 | A1 | 6/2007 | Sinclair | 711/203 |

FOREIGN PATENT DOCUMENTS

| | | |
|---|---|---|
| EP | 1 100 001 B1 | 8/2003 |
| EP | 1 571 557 A | 9/2005 |
| EP | 1 729 218 A1 | 12/2006 |
| GB | 2 204 973 A | 11/1988 |
| JP | 62-283496 A | 12/1987 |
| JP | 2002-251310 A | 9/2002 |
| WO | WO 00/49488 A1 | 8/2000 |
| WO | WO 2004/012027 A2 | 2/2004 |
| WO | WO 2004/040455 A2 | 5/2004 |
| WO | WO 2004/046937 A1 | 6/2004 |
| WO | WO 2005/103903 A1 | 11/2005 |

OTHER PUBLICATIONS http://www.webopedia.com/TERM/F/fragmentation.html, "What is fragmentation?" pp. 1-3.* http://en.wikipedia.org/wiki/File_system_fragmentation, "File system fragmentation" pp. 1-5.*

Intel AP-686 Application Note, "Flash File System Selection Guide," Dec. 1998, 18 pages.

Ban, Amir, "Local Flash Disks: Two Architectures Compared," M-Systems Flash Disk Pioneers, White Paper, Rev. 1.0, Aug. 2001, 9 pages.

Ban, Amir, "Inside Flash File Systems—Part I", IC Card Systems & Design, Jul./Aug. 1993, pp. 15-16, 18.

Ban, Amir, "Inside Flash File Systems—Part II", IC Card Systems & Design, Sep./Oct. 1993, pp. 21-24.

ISO/IEC, International Standard, "Information technology—Identification cards—Integrated circuit(s) with contacts—Part 4: Interindustry commands for interchange," ISO/IEC 7816-4, First Edition, Sep. 1, 1995, 46 pages.

Kolowsky et al., "Introduction to MTP: Media Transfer Protocol," Cypress Semiconductor.

Rankl, Wolfgang et al., "Smart Card Handbook," Third Edition, Translated by Kenneth Cox, John Wiley & Sons, Ltd., 2004, pp. 52-93, 233-369, and 435-490.

U.S. Appl. No. 10/897,049, Specification, Claims, Abstract, and Drawings, filed Jul. 21, 2004, pp. 1-39.

U.S. Appl. No. 11/196,869, Specification, Claims, Abstract, and Drawings, filed Aug. 3, 2005, pp. 1-51.

U.S. Appl. No. 11/259,423, Specification, Claims, Abstract, and Drawings, filed Oct. 25, 2005, pp. 1-60.

U.S. Appl. No. 60/705,388, entitled, "Direct Data File Storage in Flash Memories".

ISA/EPO, "Notification of Transmittal of the International Search Report and the Written Opinion of the International Searching Authority, or the Declaration," mailed on Jul. 30, 2007 in corresponding Int'l. App. No. PCT/US2006/061733, 14 pages.

USPTO, Office Action mailed in related U.S. Appl. No. 11/300,568 on Sep. 21, 2007, 17 pages.

USPTO, Final Office Action mailed in related U.S. Appl. No. 11/300,568 on Oct. 28, 2008, 23 pages.

European Office Action mailed Feb. 25, 2009 in application No. 06848548.1.

European Office Action mailed Jan. 19, 2010 in application No. 06848548.1.

Office Action dated Jun. 8, 2010 for Taiwan Patent Application No. 095146712.

* cited by examiner

LOGICALLY-ADDRESSED FILE STORAGE METHODS

CROSS-REFERENCE TO RELATED APPLICATIONS

This application is related to U.S. patent application Ser. No. 11/300,568, entitled, "Logically-Addressed File Storage Systems," filed on the same day as the present application.

BACKGROUND

This application relates to the operation of re-programmable non-volatile memory systems such as semiconductor flash memory, and, more specifically, to the management of data within such a memory. All patents, patent applications, articles and other publications, documents and things referenced herein are hereby incorporated herein by this reference in their entirety for all purposes.

In an early generation of commercial flash memory systems, a rectangular array of memory cells were divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In later generations of flash memory systems, the size of the erase unit was increased to a block of enough memory cells to store multiple sectors of data. Even though host systems with which the memory systems are connected may program and read data in small minimum units such as sectors, a large number of sectors are stored in a single erase unit of the flash memory. It is common for some sectors of data within a block to become obsolete as the host updates or replaces logical sectors of data. Since the entire block must be erased before any data stored in the block can be overwritten, new or updated data are typically stored in another block that has been erased and has remaining capacity for the data. This process leaves the original block with obsolete data that take valuable space within the memory. But that block cannot be erased if there are any valid data remaining in it.

Therefore, in order to better utilize the memory's storage capacity, it is common to consolidate or collect valid partial block amounts of data by copying them into an erased block so that the block(s) from which these data are copied may then be erased and their entire storage capacity reused. It is also desirable to copy the data in order to group data sectors within a block in the order of their logical addresses since this increases the speed of reading the data and transferring the read data to the host. If such data copying occurs too frequently, the operating performance of the memory system can be degraded. This particularly affects operation of memory systems where the storage capacity of the memory is little more than the amount of data addressable by the host through the logical address space of the system, a typical case. In this case, data consolidation or collection may be required before a host programming command can be executed. The programming time is then increased.

The sizes of the blocks are increasing in successive generations of memory systems in order to increase the number of bits of data that may be stored in a given semiconductor area. Blocks storing 256 data sectors and more are becoming common. Additionally, two, four or more blocks of different arrays or sub-arrays are often logically linked together into metablocks in order to increase the degree of parallelism in data programming and reading. Along with such large capacity operating units come challenges in operating them efficiently.

A common prior interface between a host and a memory system uses a logical addressing scheme for sectors of data stored by the memory. However, host files often become logically fragmented when they are mapped to a logical address space and as a result they may be distributed widely throughout the memory array. This can make managing the memory array more difficult because blocks in the memory array contain portions of many files and therefore often contain a mix of valid and obsolete data. In order to reclaim the space occupied by obsolete data, it may be necessary to copy a large amount of valid data.

SUMMARY OF THE INVENTION

A memory system according to an embodiment of the present invention receives data from a host that uses a logical addressing scheme. The host first maps host files to a logical address space. Then, the host provides the memory system with signals that indicate which file a particular sector of host data is allocated to. Subsequently, when the sector of host data is received by the memory system, the memory system uses the allocation information that it previously received to determine where to store the sector of host data. Specifically, the memory system puts sectors from the same host file in the same metablock of the memory array. A file may occupy more than one metablock in this way. The host also signals when the end of a host file has been sent so that the memory system may close the file and perform operations to more efficiently store the file.

A notification scheme used by a host to inform a memory system of the allocation of sectors of data uses Directory and FAT sectors so that the signals of the notification scheme are compatible with prior logical interfaces. In particular, the start of a new file is identified by a Directory sector that indicates the first cluster of the file. Then, when the sectors of that cluster are sent, they are stored in a new metablock. Any cluster that is logically sequential to the previous cluster received may be presumed to be from the same file as the previous cluster. When a new cluster is sent by a host that is not from the same file as the previous cluster, the host indicates this change. If the new cluster is from a new host file (no sectors from this file previously sent, therefore no metablock open for the file) the host sends a Directory sector to indicate the start of a new file. If the new cluster is from an open file (sectors from this file previously sent and stored in one or more metablocks for the file), then the host sends a FAT sector including a FAT entry for the previous cluster of the open file including a pointer to the new cluster. In addition to sending signals to indicate file allocation information, the host may send a FAT sector to indicate the end of a file. Such a FAT sector contains an entry for the last cluster of the file indicating an End of File. Unlike prior schemes that store FAT and Directory information in nonvolatile memory, the present scheme sends the allocation information before sending the host data to which it refers. Also, most prior schemes do not provide for the memory system to use allocation information sent by the host as FAT and Directory sectors.

A memory system may use file allocation information provided by the host to keep data of a particular host file together. Even though the host file may be logically fragmented when it is mapped by the host to a logical address range, the memory system can use the information regarding this mapping to store data of a file in a dedicated block. Thus, a new block is opened when the host indicates the start of a new file. Subsequently, any data indicated as being from that block is stored in the same metablock. Additional metablocks are opened for the file as necessary. Eventually, the host indicates the end of the file, or the memory system closes the file for some other reason. At this point, if there is a metablock that is only partially filled with data from the host file, that residual data may be combined with similar residual data from other files in a common block. Subsequently, if the host deletes the file (as indicated by a Directory sector or otherwise) the space occupied by the file may easily be recovered with very little copying of valid data because most of the file is in dedicated metablocks. A notification scheme may also allow a host to inform a memory system when power is about to be removed so that the memory system can prepare for power loss (e.g. by storing any data in volatile memory to nonvolatile memory). A notification scheme may also allow a host to inform a memory system when power will be maintained so that the memory system can perform housekeeping operations such as reclaim operations.

DESCRIPTION OF EXEMPLARY EMBODIMENTS

Flash Memory General Description

A current flash memory system and a typical operation with host devices are described with respect to FIGS. 1-7. It is in such a system that the various aspects of the present invention may be implemented. A host system 1 of FIG. 1 stores data into and retrieves data from a flash memory 2. Although the flash memory can be embedded within the host, the memory 2 is illustrated to be in the more popular form of a card that is removably connected to the host through mating parts 3 and 4 of a mechanical and electrical connector. There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

Figure 1:
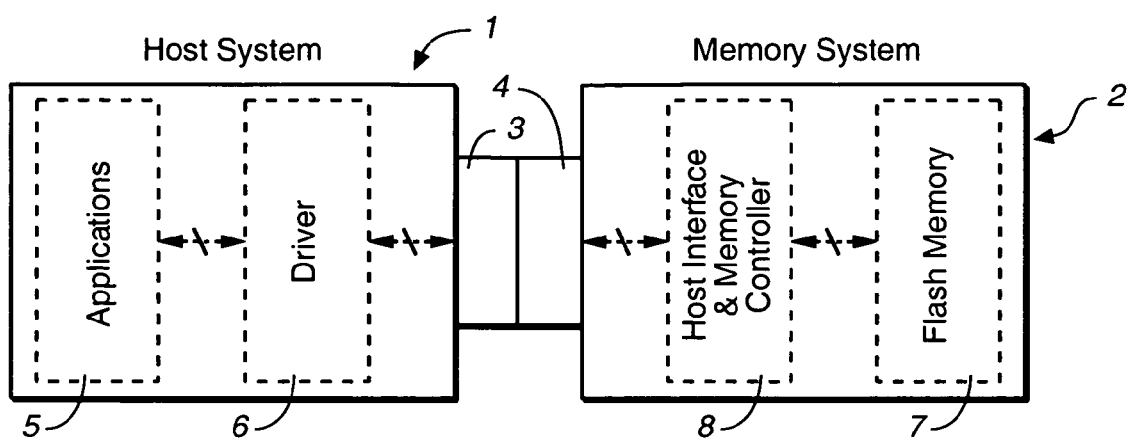
FIG. 1 schematically illustrates a host and a connected non-volatile memory system as currently implemented.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
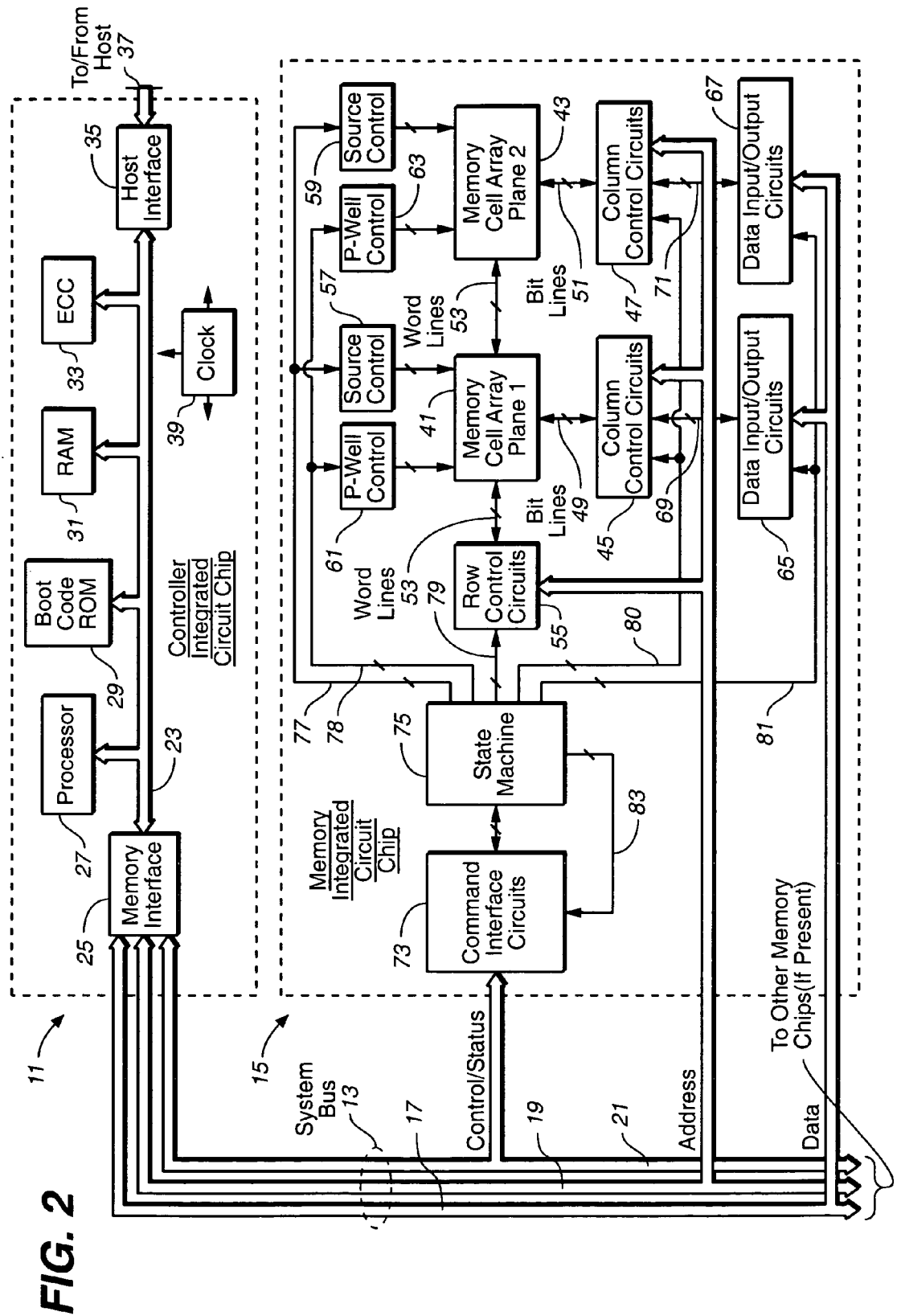
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915,039, filed Aug. 9, 2004, entitled "Ring Bus Structure and Its Use in Flash Memory Systems."

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, read-only-memory (RAM) 31 used primarily to buffer data being transferred between the memory and a host, and circuits 33 that calculate and check an error correction code (ECC) for data passing through the controller between the memory and the host. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States Patent Application Publication No. 2003/0147278.

Figure 3:
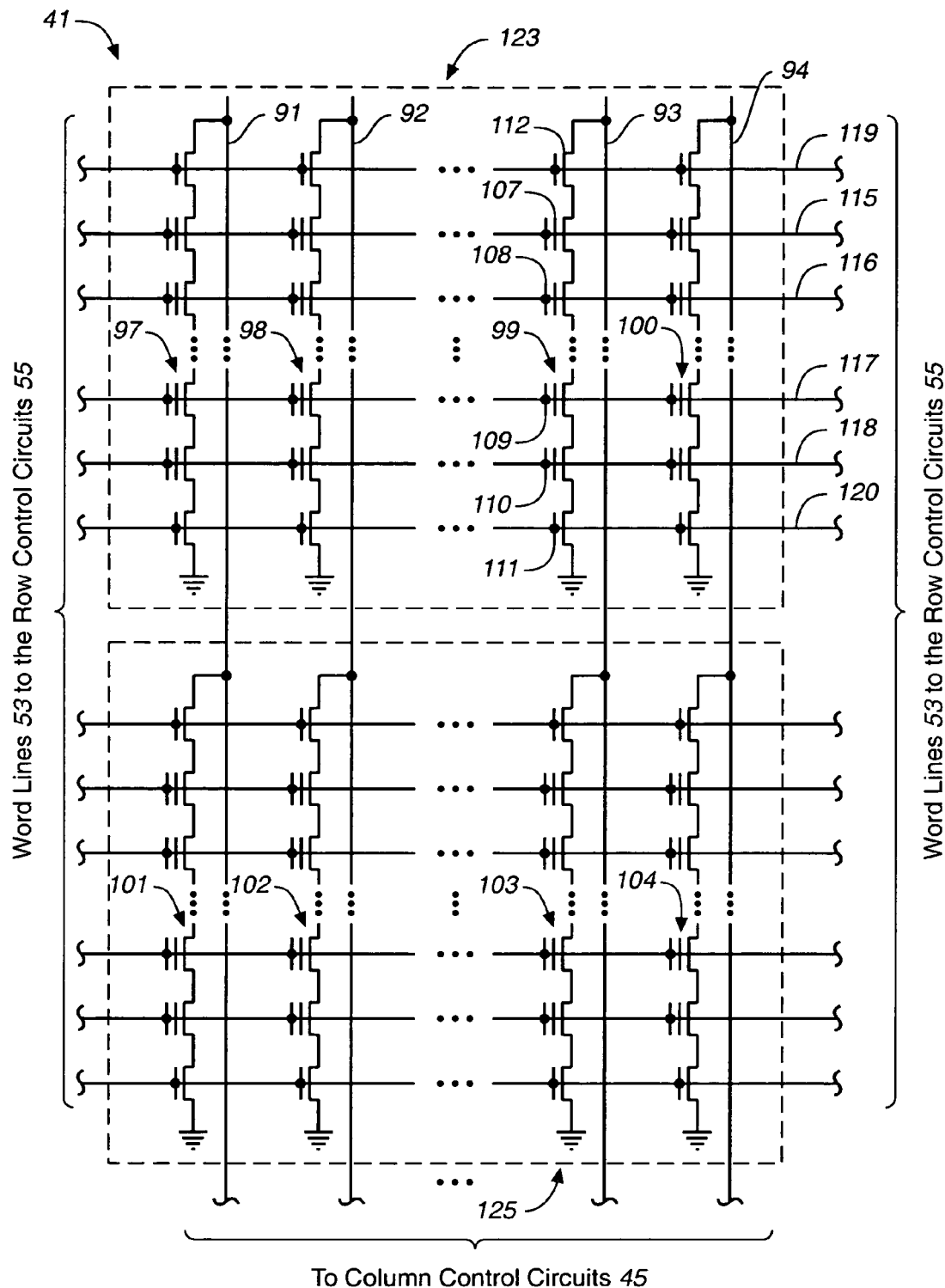
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in United States Patent Application Publication No. 2003/0109093.

Figure 4:
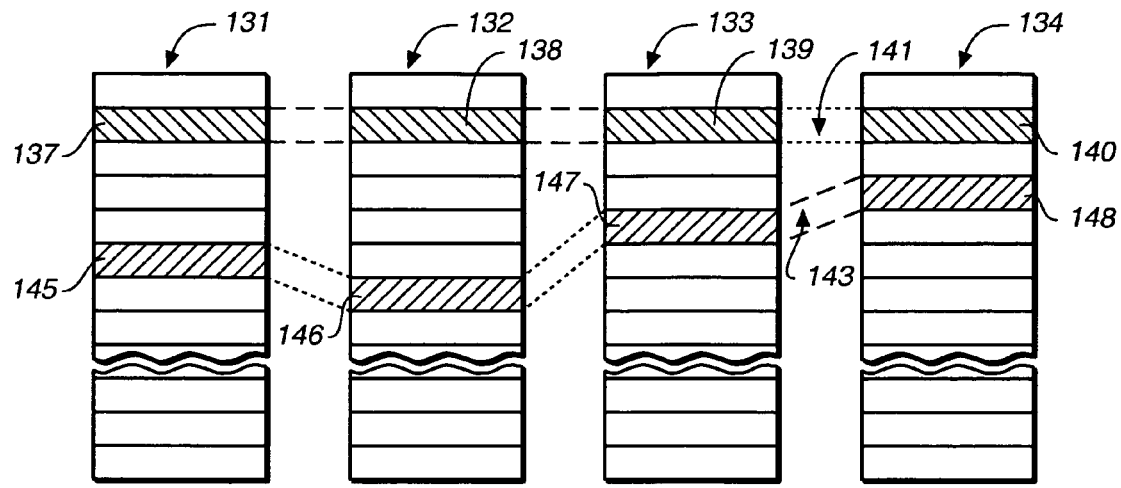
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane. As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
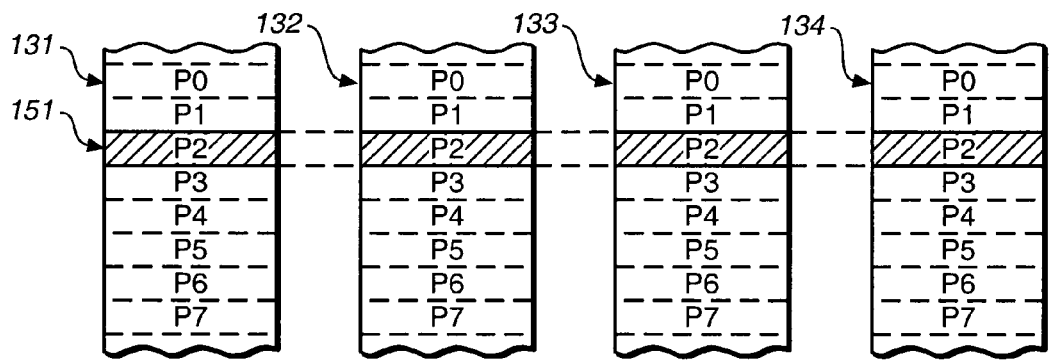
FIG. 5 shows an expanded view of a portion of the physical memory of FIG. 4.

The individual blocks are in turn divided for operational purposes into pages of memory cells, as illustrated in FIG. 5. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 131-134. The metapage 151, for example, includes the page P2 in of each of the four blocks but the pages of a metapage need not necessarily have the same relative position within each of the blocks. Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
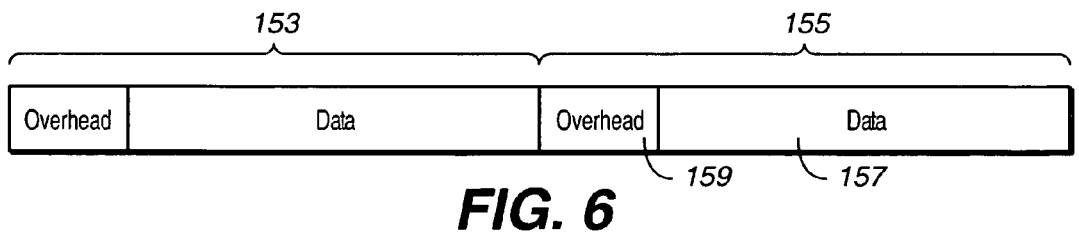
FIG. 6 shows a further expanded view of a portion of the physical memory of FIGS. 4 and 5.

The amount of data in each logical page is typically an integer number of one or more sectors of data, each sector containing 512 bytes of data, by convention. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage. While many examples described in the present application use metablocks and metapages as the units of erase and programming respectively, most of the techniques described are equally applicable where blocks and pages are the units of erase and programming. Similarly, techniques applied to memory systems using blocks and pages are generally applicable to metablocks and metapages.

Figure 7:
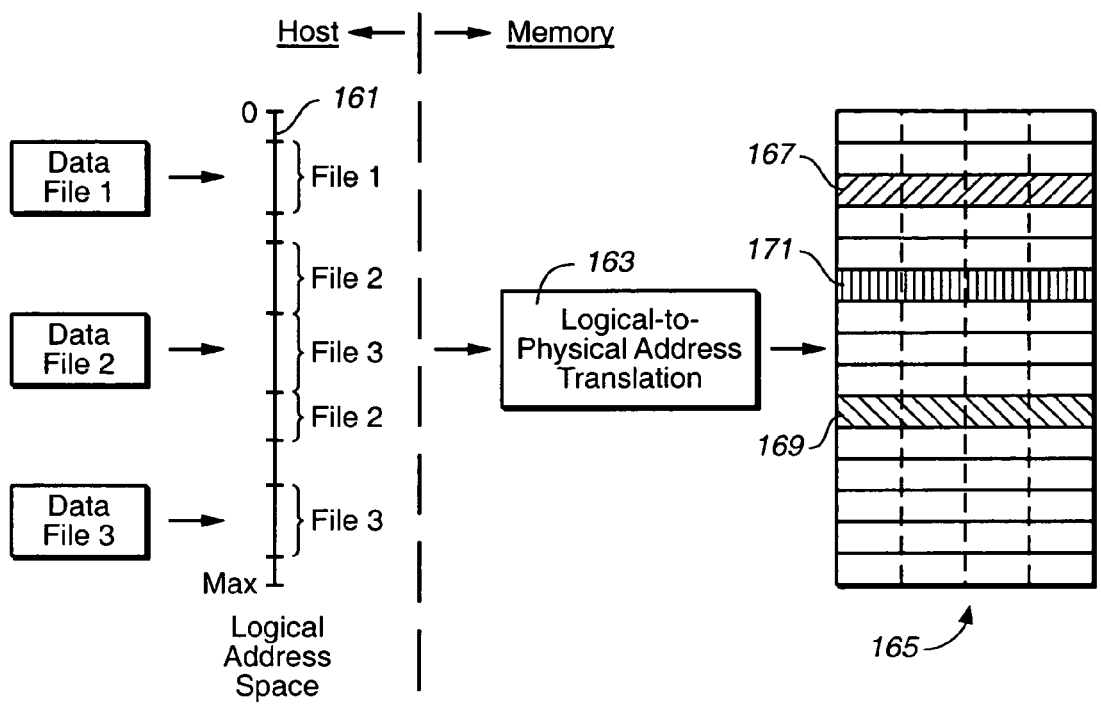
FIG. 7 illustrates a common logical address interface between a host and a reprogrammable memory system.

The physically small re-programmable non-volatile memory cards and flash drives identified above are commercially available with data storage capacity of 512 megabytes (MB), 1 gigabyte (GB), 2 GB and 4 GB, and may go higher. FIG. 7 illustrates the most common interface between a host and such a mass memory system. The host deals with data files generated or used by application software or firmware programs executed by the host. A word processing data file is an example, and a drawing file of computer aided design (CAD) software is another, found mainly in general computer hosts such as PCs, laptop computers and the like. A document in the pdf format is also such a file. A still digital video camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

Memory systems, especially memory systems embodied in removable cards, may communicate with different hosts via a standard interface. Different hosts may use different interfaces for communication with memory systems. Two categories of interfaces are those using a logical addressing system with a common logical address space and those using a file based addressing system.

Logical Addressing

A common logical interface between the host and the memory system is illustrated in FIG. 7. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data and some overhead data.

Three Files 1, 2 and 3 are shown in the example of FIG. 7 to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 7. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 and other data. File 1, File 2 and File 3 are all assigned to portions of a common logical address space (logical address space 161) in this example.

The host keeps track of the memory logical address space by maintaining a File Allocation Table (FAT) and a Directory, where the logical addresses the host assigns to the various host files are maintained. The Directory and FAT are typically stored in the non-volatile memory, as well as in a host memory, and are frequently updated by the host as new files are stored, other files deleted, files modified and the like. When a host file is deleted, for example, the host may deallocate the logical addresses previously allocated to the deleted file by updating the Directory and FAT table to show that they are now available for use with other data files. In some cases, only the directory is updated when a file is deleted and FAT entries remain for obsolete clusters of data. A logical address used in the FAT may be referred to as a Logical Block Address (LBA), so an interface using such logical addressing over a logical address space that is commonly used for data from different files may be referred to as an LBA interface.

The host is not concerned about the physical locations where the memory system controller chooses to store the files. The typical host only knows its logical address space and the logical addresses that it has allocated to its various files. The memory system, on the other hand, through a typical host/card interface, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not generally know, however, how the data received have been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. When the host writes data to the memory system, the controller converts the logical addresses assigned by the host to physical addresses within a metablock in the erased block pool. Other metablocks not being used to store data within the logical address space 161 are then erased and designated as erased pool blocks for use during a subsequent data write operation.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address have been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new metablock, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status indicator until such an operation is completed. An example of where execution of a host command can be delayed is where there are not enough pre-erased metablocks in the erased block pool to store all the data that the host wants to write into the memory and data consolidation or garbage collection is needed first to clear one or more metablocks of valid data, which can then be erased. Attention has therefore been directed to managing control of the memory in order to minimize such disruptions. Many such techniques are described in the following U.S. patent application Ser. No. 10/749,831, filed Dec. 30, 2003, entitled "Management of Non-Volatile Memory Systems Having Large Erase Blocks"; Ser. No. 10/750,155, filed Dec. 30, 2003, entitled "Non-Volatile Memory and Method with Block Management System"; Ser. No. 10/917,888, filed Aug. 13, 2004, entitled "Non-Volatile Memory and Method with Memory Planes Alignment"; Ser. No. 10/917,867, filed Aug. 13, 2004; Ser. No. 10/917,889, filed Aug. 13, 2004, entitled "Non-Volatile Memory and Method with Phased Program Failure Handling"; and Ser. No. 10/917,725, filed Aug. 13, 2004, entitled "Non-Volatile Memory and Method with Control Data Management."

One challenge to efficiently control operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, entitled "Adaptive Metablocks." The fitting of boundaries between blocks of data and physical boundaries between metablocks is described in patent application Ser. No. 10/841,118, filed May 7, 2004, and Ser. No. 11/016,271, filed Dec. 16, 2004, entitled "Data Run Programming."

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type.

To operate the memory system efficiently, it is desirable for the controller to know as much about the logical addresses assigned by the host to data of its individual files as it can. But it is difficult for the memory controller to know much about the host data file structure when the host/memory interface includes the logical address space 161 (FIG. 7), as described above.

File-Based Addressing

An alternative interface between a host and memory system for the storage of mass amounts of data eliminates use of the logical address space. The host instead logically addresses each file by a unique file ID (or other unique reference) and offset addresses of units of data (such as bytes) within the file. This file address is given directly to the memory system controller, which then keeps its own table of where the data of each host file are physically stored. This new interface can be implemented with the same memory system as described above with respect to FIGS. 2-6. The primary difference with what is described above is the manner in which that memory system communicates with a host system.

Figure 8:
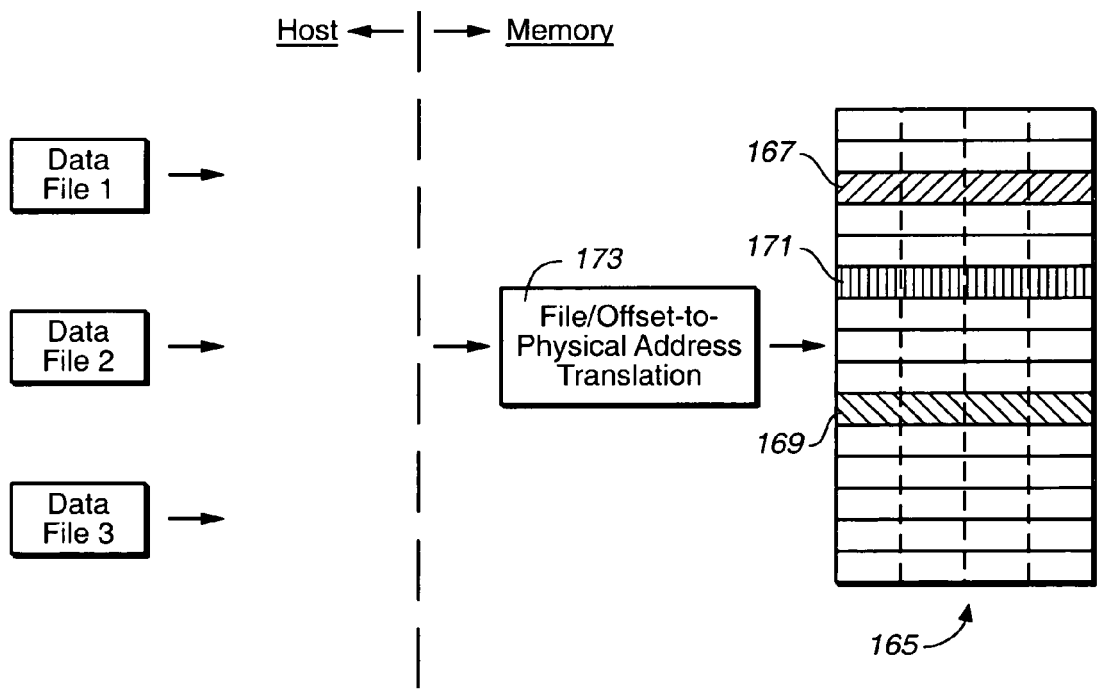
FIG. 8 illustrates a file interface between a host and a reprogrammable memory system.

This file-based interface is illustrated in FIG. 8, which should be compared with the logical address interface of FIG. 7. An identification of each of the Files 1, 2 and 3 and offsets of data within the files of FIG. 8 are passed directly to the memory controller. This logical address information is then translated by a memory controller function 173 into physical addresses of metablocks and metapages of the memory 165.

Since the memory system knows the locations of data making up each file, these data may be erased soon after a host deletes the file. This is not generally the case for a typical logical address interface. Further, by identifying host data by file objects instead of using logical addresses, the memory system controller can store the data in a manner that reduces the need for frequent data consolidation and collection. The frequency of data copy operations and the amount of data copied are thus significantly reduced, thereby increasing the data programming and reading performance of the memory system.

Examples of file-based interfaces include those using direct data file storage. Direct data file storage memory systems are described in pending U.S. patent application Ser. Nos. 11/060,174, 11/060,248 and 11/060,249, all filed on Feb. 16, 2005 naming either Alan W. Sinclair alone or with Peter J. Smith, and Provisional Application No. 60/705,388 filed by Alan W. Sinclair and Barry Wright, and entitled "Direct Data File Storage in Flash Memories" (hereinafter collectively referenced as the "Direct Data File Storage Applications").

Since the direct data file interface of these Direct Data File Storage Applications, as illustrated by FIG. 8, is simpler than the logical address space interface described above, as illustrated by FIG. 7, and allows the memory system to perform better, the direct data file storage is preferred for many applications. But host systems are primarily configured at the present time to operate with the logical address space interface, so a memory system with a direct data file interface is not compatible with most hosts. It is therefore desirable to provide the memory system with the ability to operate with either interface.

Logical to Virtual File Mapping

Figure 9:
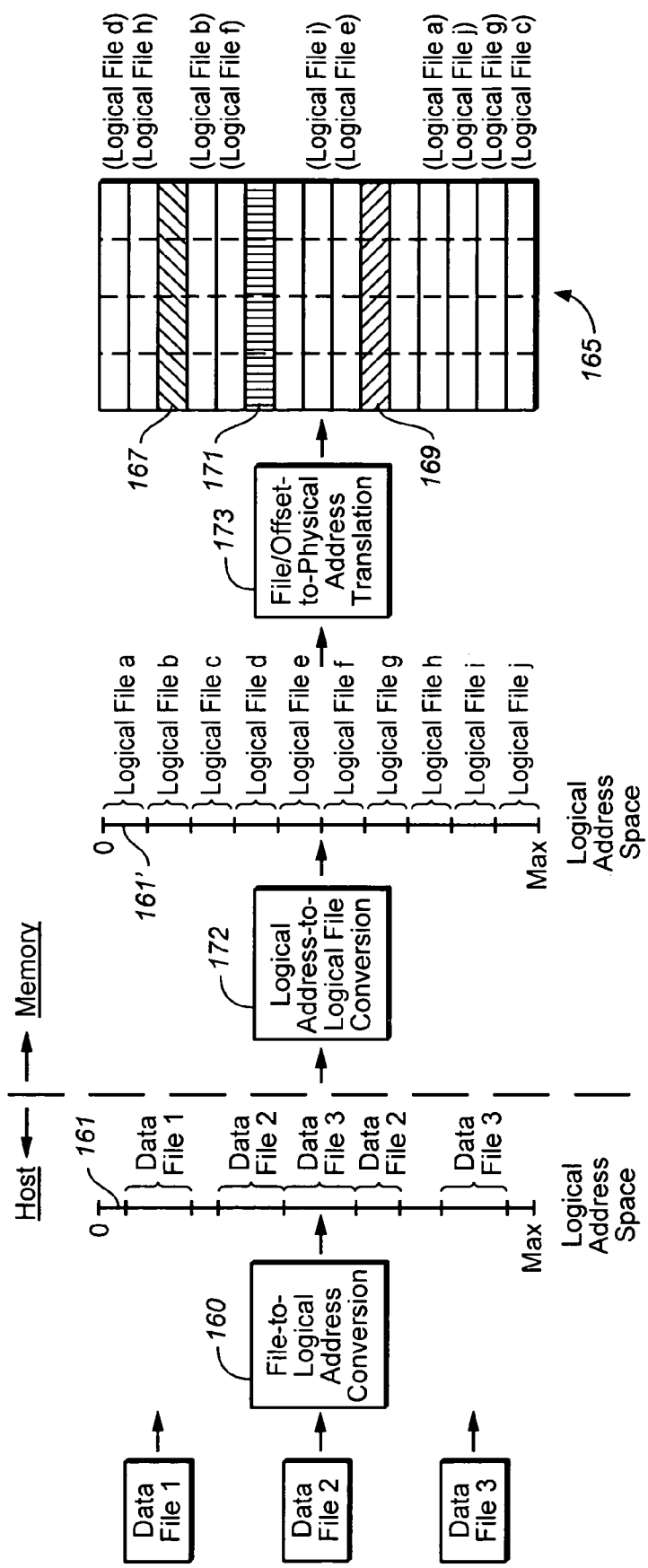
FIG. 9 illustrates a logical address interface used with logical address-to logical file conversion by a memory system.

U.S. patent application Ser. No. 11/196,869, filed on Aug. 3, 2005, entitled "Interfacing systems operating through a logical address space and on a direct data file basis" describes systems that enable a memory system to interface with hosts using either a logically addressed interface or a file-based interface. FIG. 9 illustrates such a system. This example combines the host operation of FIG. 7 with the file based memory operation of FIG. 8 plus an added address conversion 172 within the memory system. The address conversion 172 maps groups of logical addresses across the memory space 161 into individual logical files a-j shown across the modified address space 161'. The entire logical address space 161 is preferably divided into these logical files, so the number of logical files depends upon the size of the logical address space and of the individual logical files. Each of the logical files contains data of a group of contiguous logical addresses across the space 161. The amount of data within each of the logical files is preferably made to be the same, and that amount equal to the data storage capacity of one metablock in the memory 165. Unequal sizes of the logical files and/or sizes different from the storage capacity of a block or metablock of the memory are certainly possible but not preferred.

Data within each of the individual files a-j are represented by logical offset addresses within the files. The file identifier and data offsets of the logical files are converted at 173 into physical addresses within the memory 165. The logical files a-j are stored directly in the memory 165 by the same processes and protocols described in the Direct Data File Storage Applications. The process is the same as that used to store data files 1-3 of FIG. 9 in the memory 165, except that the known amount of data in each logical file can make this easier, especially if that amount is equal to the capacity of a block or metablock of the memory. It is shown in FIG. 9 that each of the logical files a-j is mapped to a different one of the metablocks of the memory 165. It is also desirable that the file based data storage interact with the host in the same or an equivalent manner as present logical address memory systems with which the host has been designed to interface. By mapping individual logical files into corresponding individual memory metablocks, essentially the same performance and timing characteristics are achieved with the direct data file interface memory system as when a logical address space interface is used.

The data file based backend storage system of FIG. 9, designed to work through a traditional logical address space interface with a host, can also have a direct data file interface added. Both host data files from the file interface and logical files converted by from the logical interface are translated into memory metablock addresses. The data are then stored in those addresses of the memory by executing a direct data file protocol. This protocol includes the direct data file storage techniques of the Direct Data File Storage Applications previously listed.

Logically-Addressed File Storage

As described above, there are advantages to maintaining data in a memory system as files that are stored in contiguous areas of a memory array and are managed in a file-based manner. However, many hosts provide data to memory systems in the form of sectors of data with logical addresses. Host files may be logically fragmented in such a system so that a host file occupies multiple logical address ranges with other data occupying intervening logical address ranges. While mapping logical address space to virtual files in a predefined manner allows logically addressed data to be handled by a file based backend, virtual files retain the logically fragmented pattern of the logical address space so that a metablock that contains a single virtual file may contain data from many host files. It is desirable for a memory system to accept logically addressed data from a host and store it in a manner that keeps data from a single host file together in one or more blocks that do not contain data from many or any other files. In this way, some of the advantages of file-based storage may be realized even with a host that sends data in the form of sectors having logical addresses from a logical address space that is common to all files.

In one embodiment, a host sends information regarding a sector of data to a memory system prior to sending the sector of data. This information may be used by the memory system to store the sector with other sectors of the same file. In this way, sectors from the same file are kept together in particular blocks that may be dedicated to storing only that file (though some blocks may store data from more than one file). The information sent by the host may be in the form of FAT and directory sectors that give allocation information on the sectors that are about to be sent. This is in reverse order to the usual sequence where a host sends sectors of data and subsequently sends allocation information in the form of FAT and directory sectors. Also, in prior systems, the memory system does not generally use the contents of FAT and directory sectors to modify its operations.

One aim of a logically-addressed file storage scheme is to accept logically fragmented data from a host and store the file in a physical arrangement that is less fragmented than the logical arrangement. Thus, a file that is mapped to two or more portions of logical address space that are not contiguous (there are other logical addresses between the two portions) is stored contiguously in the physical memory array. Storing the file in a physically contiguous manner may mean that all the data of a file is stored in a single block, or when the data in the file exceeds the capacity of a block, one or more blocks are occupied exclusively by data from the file and only one block contains data from the file and other data that are not from the file. The blocks that store data from the file need not be in any particular arrangement. Thus, "contiguous" in this context does not mean that the blocks containing the file are located together but refers to the arrangement of data within individual blocks.

Figure 10:
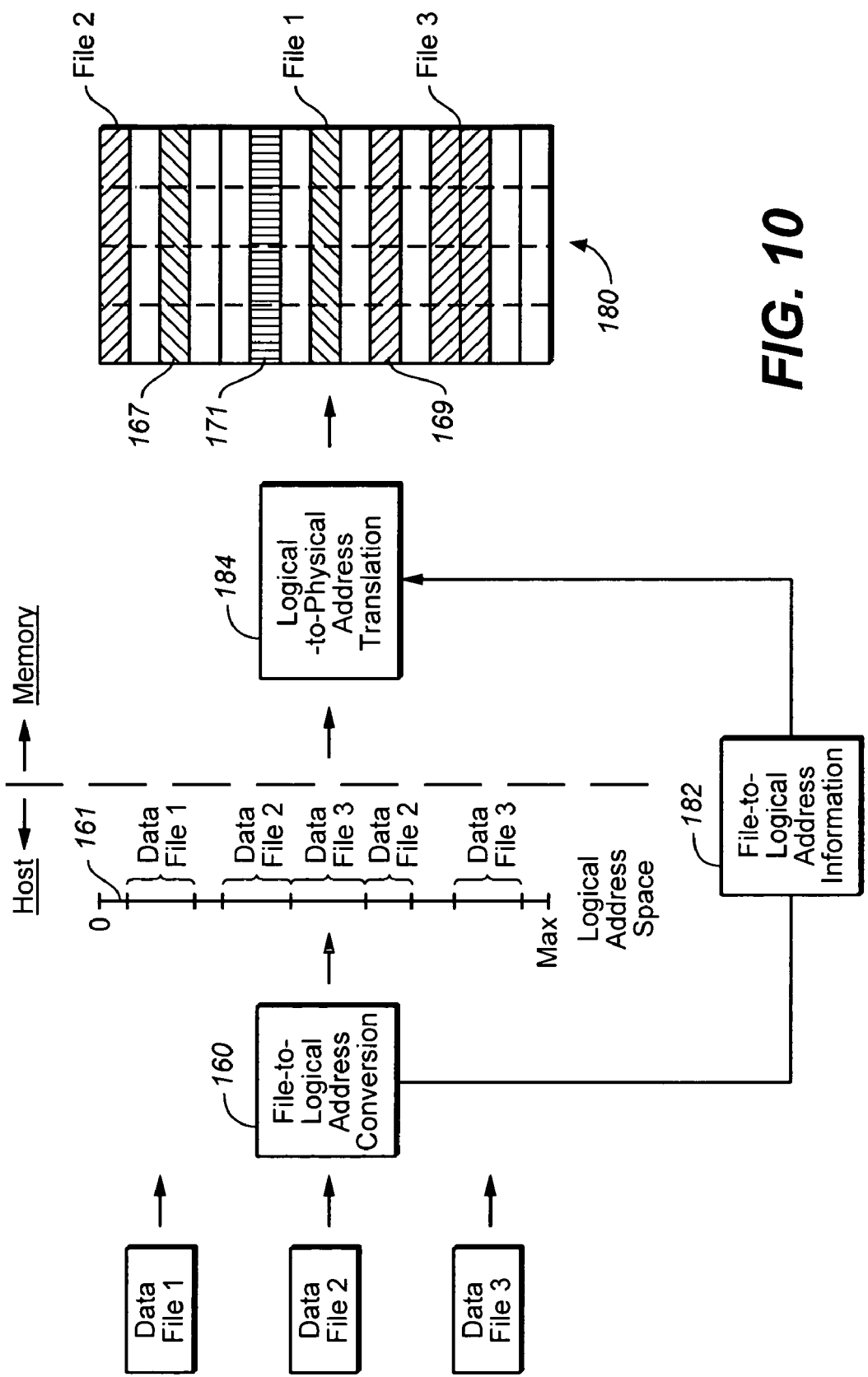
FIG. 10 illustrates a logical interface between a host and a memory system with logical-to-physical address translation in the memory system being dependent on file-to-logical address information received from the host.

FIG. 10 shows a logically-addressed file storage scheme according to an embodiment of the present invention. File 1, file 2 and file 3 are sent by a host for storage in memory array 180. File-to-logical address conversion 160 is performed by the host in a similar manner to that shown in FIG. 7 so that files 1, 2 and 3 are mapped to a common logical address space 161. Files may become logically fragmented by this mapping as shown by data file 2 which occupies two portions of logical address space 161 that are separated by an intermediate portion that is not occupied by data of file 2. Similarly, data file 3 is split into two portions. In some memory systems, files may become much more fragmented with files occupying many separated portions of logical address space. File-to-logical address conversion information 182 is generated when data files 1, 2 and 3 are mapped to logical address space by file-to-logical address conversion 160. File-to-logical address conversion information 182 is passed to the memory. However, unlike many prior systems, in this case file-to-logical conversion information 182 is sent to the memory before the data that it refers to. Thus, information reflecting the mapping of file 2 to two different logical address ranges of logical address space 161 is sent to the memory before the sectors of data of those logical address ranges are sent. File-to-logical address conversion information 182 allows logical-to physical address translation 184 to be done in a way that uses file-to-logical address conversion information 182 to determine the physical locations where individual sectors are stored.

Figure 11:
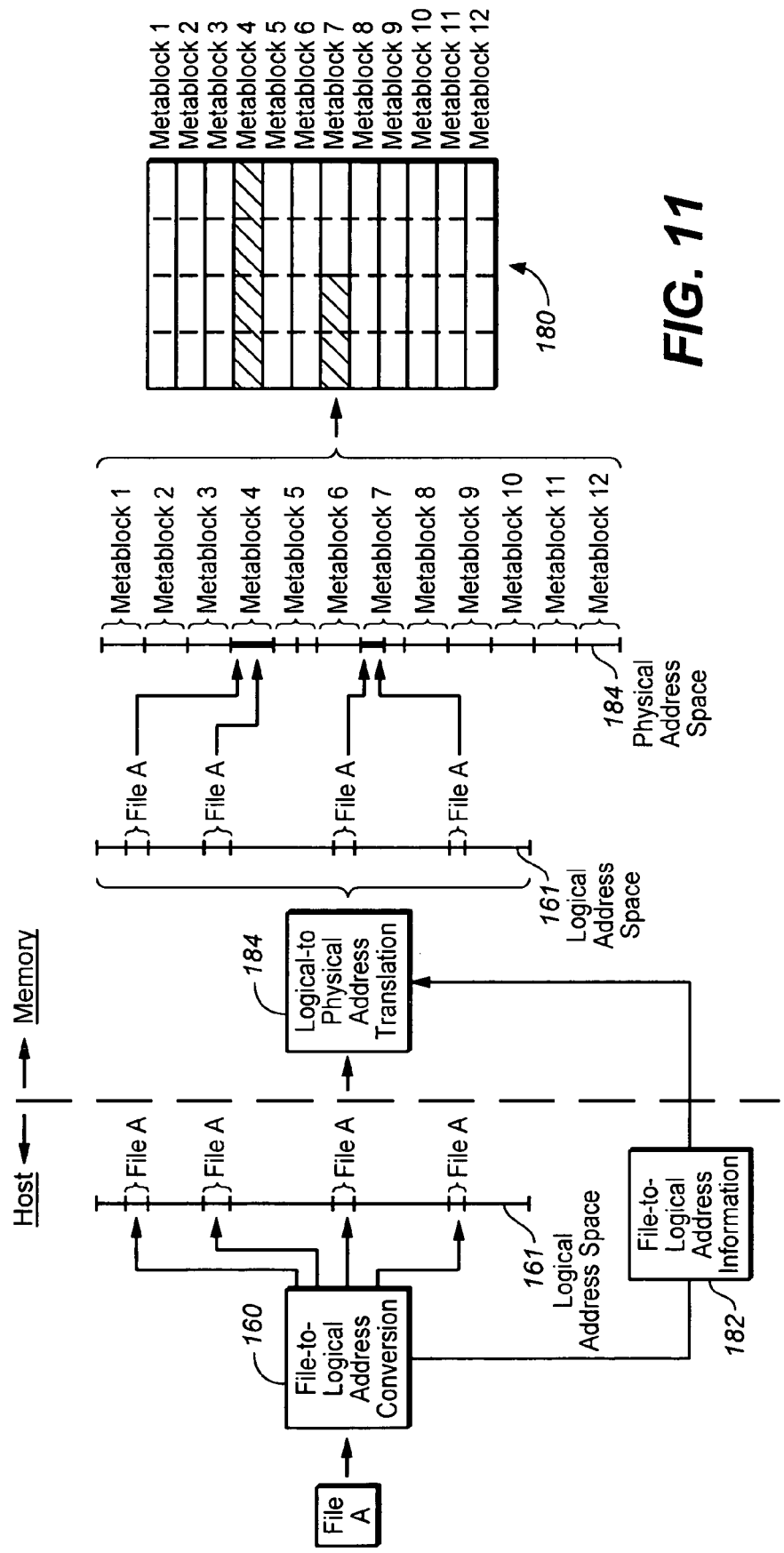
FIG. 11 illustrates the logical interface of FIG. 10 with a file logically fragmented by a host and subsequently defragmented by the memory system when it is stored.

FIG. 10 shows metablock 167 allocated as a reserved block; metablock 169 allocated for storage of host operating software, the host FAT table and the like; and metablock 171 maintained in an erased block pool as before. FIG. 10 also shows File 1 stored in one metablock, File 2 in another metablock and File 3 occupying two other metablocks. Even though File 2 is mapped to two separate portions of logical address space 161, the two portions of File 2 are stored together as a result of the logical to physical address translation 184. Similarly, File 3 is logically fragmented into two parts occupying two portions of logical address space 161 that are separated from each other. Additional data that are not part of File 3 are mapped to the intervening portion of logical address space. However, the logically separated portions of File 3 are stored together in two metablocks that do not contain data of other files. This arrangement of files in metablocks that only contain data of a single file is advantageous because, when a file becomes obsolete an entire metablock becomes obsolete and there is no need for copying of valid data as is generally done during garbage collection. It may not be efficient to have all metablocks storing only data of one file because files may not fill an integer number of metablocks and maintaining unused portions of metablocks reduce memory capacity. However, fragmentation of files in the memory array may still be reduced compared with prior systems even where some metablocks contain data from more than one file FIG. 11 shows an example of File A that is mapped to logical address space 161 and is logically fragmented into four portions by this mapping. File-to-logical address conversion information 182 regarding this mapping is sent to the memory before the data are sent to the memory. Thus, the logical addresses to which portions of File A are mapped are identified with File A by file-to-logical address information 182. Then, when the data of File A are sent to the memory, the locations at which the data of File A are stored are determined by their identification with File A. FIG. 11 shows the logical to physical translation 184 that takes place in the memory. The portions of File A that are mapped to separated portions of logical address space 161 are mapped to contiguous portions of physical memory array 180. In this example, metablock 4 is filled with data from File A and metablock 7 is partially filled with data from File A. The data in metablock 7 may later be combined with data from other files so that space in the memory array is not wasted. However, metablock 4 remains dedicated to storing only data from File A. Once File A is closed, the memory may consolidate the data in metablock 7 with other similar data from other files. A scheme for carrying out such consolidation of partial metablocks is given in the Direct Data File applications where residual file data from multiple files are combined in a single common block in an efficient manner.

Notification Scheme

Figure 12:
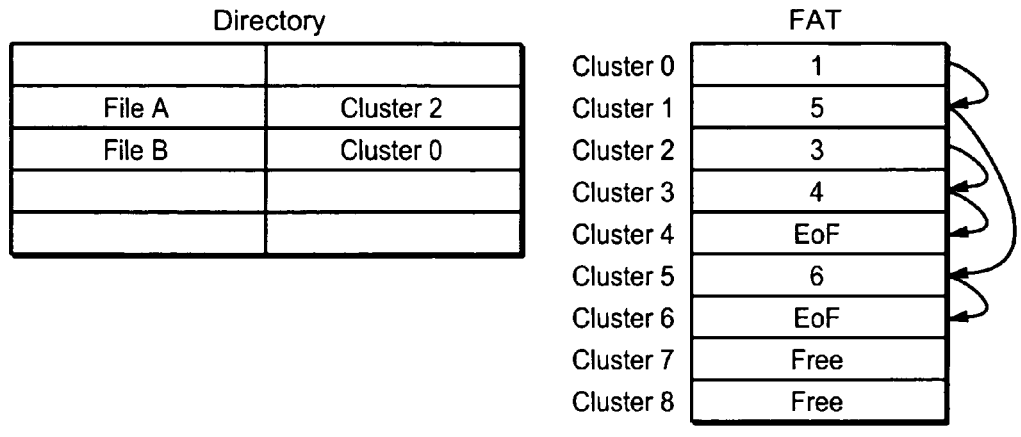
FIG. 12 illustrates the storage of file allocation information for files A and B in a memory system using a Directory and File Allocation Table (FAT)

Various notification schemes are possible to send file-to-logical address conversion information from the host to the memory. In one example, the notification scheme used follows the same format as generally used when storing control information in the memory. This scheme uses FAT sectors and directory sectors to update FAT and directory information in the nonvolatile memory so that it is available for later recovery. FIG. 12 shows how file allocation information may be stored. Files A and B are stored in a memory. A directory contains entries for both file A and file B. A directory entry contains various information about a file including the address of the first cluster of the file. Thus, for file A the directory entry indicates that cluster 2 is the first cluster, so the first FAT entry for file A is the entry for cluster 2. For file B, the directory entry indicates that the first cluster is cluster 0. The FAT contains cluster entries that indicate the next cluster for that file. Thus, when the location of the first FAT entry for a file is obtained from the directory, subsequent FAT entries are indicated by the FAT entry for the previous cluster allocated to that file. FAT entries may be considered to be "chained" because of the way one FAT entry points to the location of the next FAT entry for a particular file. For File A, cluster 2 is indicated by the directory as the first cluster. The entry for cluster 2 indicates that cluster 3 is the next cluster for File A. The entry for cluster 3 indicates that cluster 4 is the next cluster for File A. The entry for cluster 4 indicates an End of File (EoF). Thus, cluster 4 is the last cluster allocated to File A. For File B, the directory indicates that cluster 0 is the first cluster. The entry for cluster 0 indicates that cluster 1 is the next cluster for File B. The entry for cluster 1 indicates that cluster 5 is the next cluster for File B. The entry for cluster 5 indicates that cluster 6 is the next cluster for File B and the entry for cluster 6 indicates an End of File. Thus, cluster 6 is the last cluster of File B. FAT and directory information is generally maintained by a host and is stored in the nonvolatile memory on a regular basis by sending FAT sectors and directory sectors.

Previous schemes have used Directory and FAT structures to store file-to-logical address information. However, unlike previous schemes, a scheme according to an embodiment of the present invention sends file-to-logical address information before the data are sent to the memory. In a typical prior system, FAT and directory sectors were only sent after the data to which they referred were sent and stored in the memory. One reason to delay sending FAT and directory sectors is to avoid having incorrect information recorded in nonvolatile memory in case of a loss of power before the data was written. In one embodiment, a scheme avoids this problem by only writing part of the FAT for a file prior to storing the file to which it refers. In this way, if a loss of power occurs the partial FAT indicates that writing the file was not completed and that the file data may not be usable.

Figure 13:
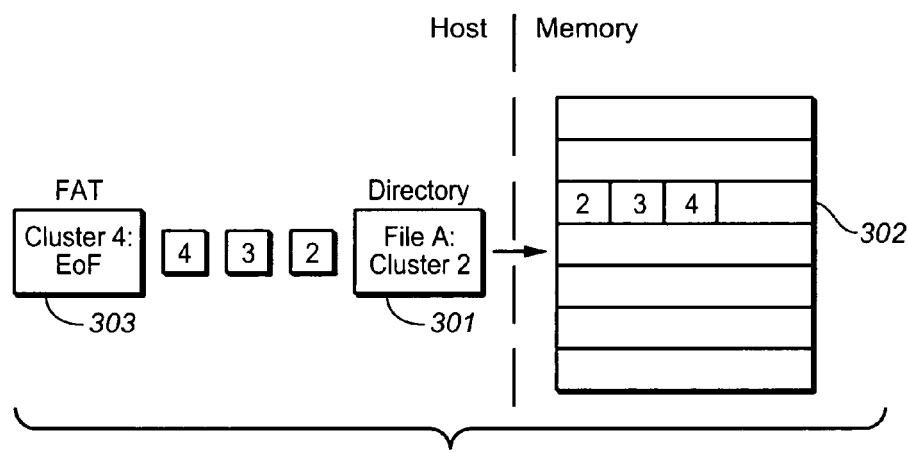
FIG. 13 illustrates operation of a notification scheme for host file A sent as logically sequential clusters of host data.

In an exemplary notification scheme, FAT and directory sectors are sent by the host to inform the memory about the file allocation of sectors of data that are to be sent by the host. It is not generally necessary to send file allocation information for each cluster of host data sent. In general, where a host sends sequential clusters of sectors, the memory assumes that the clusters belong to the same file. Thus, where a single file is sent as a stream of sequential clusters, the host may just identify the file before the first cluster is sent and send an end of file indicator after the last sector. FIG. 13 shows an example of the host sending File A of FIG. 12 to the memory. First, a directory sector 301 is sent indicating that cluster 2 is the first cluster of File A. Then the sectors of cluster 2 are sent and are stored by the memory in a new block 302 of the memory array because this is the start of a new host file. Subsequently, sectors of clusters 3 and 4 are received sequentially and are stored in the same block with sectors of cluster 2. After cluster 4 is received, the host sends a FAT sector 303 with an End of File entry for cluster 4 indicating that it is the last cluster in file A. Full FAT information for file A may also be sent at this point because the whole of file A has been stored. At this point, the memory can close file A and could perform reclaim operations if desired. This shows an example of a file that is sent in a logically sequential manner and without any intermediate writing to other files.

Figure 14:
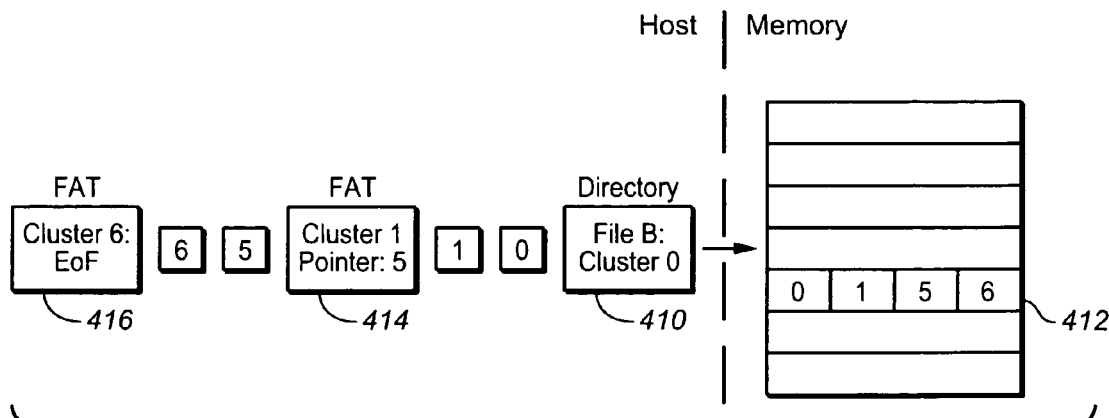
FIG. 14 illustrates operation of a notification scheme for host file B sent as clusters of host data including a jump in logical address.

FIG. 14 shows the example of a host sending File B of FIG. 12. First, a directory sector 410 is sent indicating that the first cluster of File B is cluster 0. Then, the sectors of cluster 0 are sent and stored in a new block 412 because these are the first sectors of a new file. Then, the sectors of cluster 1 are received and because these are sequential to the sectors of cluster 0, it is assumed that they are also from File B, so they are also stored in block 412. Next, a FAT sector 414 is received that contains a FAT entry for cluster 1 and the pointer for this entry indicates that cluster 5 is the next cluster in file B. FAT sector 414 may not contain an entry for cluster 5 at this point because cluster 5 has not yet been sent by the host. FAT sector 414 informs the memory controller that although there is a jump in logical address from cluster 1 to cluster 5, the sectors of cluster 5 contain the next data from File B after cluster 1. Then, when the sectors of cluster 5 are received, they are stored with the sectors of cluster 1 in block 412. Then, cluster 6 is received and is also stored in block 412 because it is sequential to cluster 5. Subsequently, a FAT sector 416 is received that contains an End of File entry for cluster 6. File B can then be closed and reclaim operations can be performed if necessary on the block containing File B. In some cases, the memory may assume that when there is a jump in logical address that the host will continue writing the next cluster of the same file. In such a memory system, no specific notification is needed when the host continues writing data from the same file with a jump in logical address. FIG. 14 may be considered an example of a logically non-sequential writing of a file without intermediate writing to other files because, though there is a jump in logical address between sectors of cluster 1 and sectors of cluster 5, the host sends File B over a time period that is dedicated to sending File B (i.e. no sectors of data from other files are sent in this time).

Figure 15A:
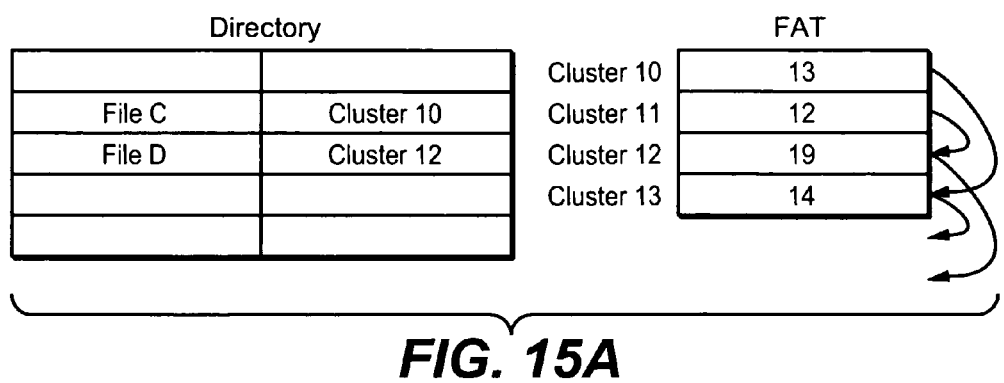
FIG. 15A illustrates the storage of file allocation information for files C and D in a memory system including a Directory and File Allocation Table (FAT)

FIG. 15A shows two files C and D mapped by a host to part of a logical address space. In this case, two files C and D are not only fragmented in logical address space but are also sent in a temporally fragmented manner. The clusters of files C and D are sent by the host in logical order so that cluster 10 is sent first, then cluster 11, then cluster 12 and so on. This involves some changes from one file to another even though the clusters are sent in logically sequential order. The memory is informed of these changes between files by the host.

Figure 15B:
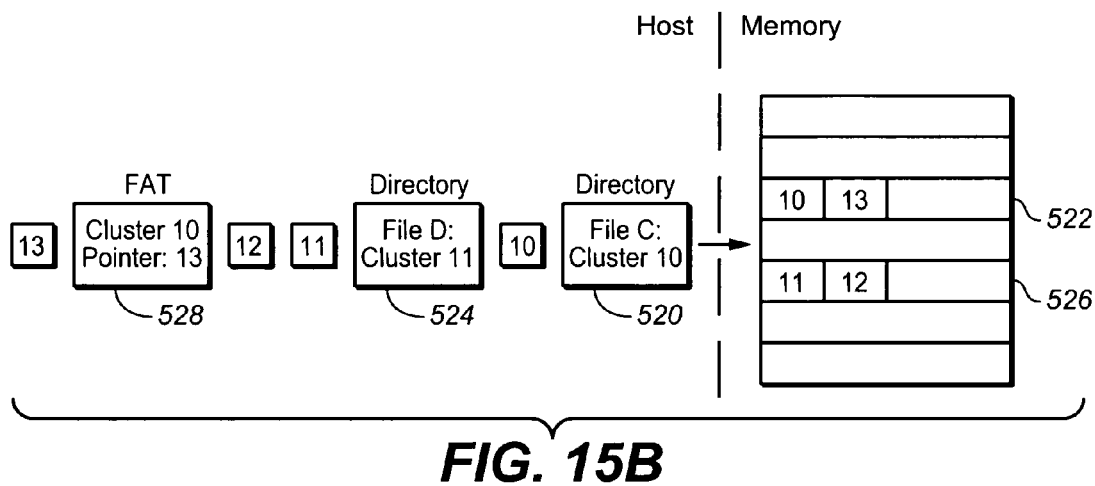
FIG. 15B illustrates a notification scheme for host files C and D that are sent as logically sequential clusters that alternate between clusters of sectors of file C and file D.

FIG. 15B shows how the host informs the memory when the host starts writing to a different file. First, a directory sector 520 is sent indicating that cluster 10 is the first cluster of file C. Then, the sectors of cluster 10 are sent by the host and are stored in the memory array in a new block 522 because they are the first sectors of a new file. Next, the host sends another directory sector 524 indicating that cluster 11 is the first cluster of file D. Subsequently, cluster 11 is send and is stored in another new block 526. Then, cluster 12 is received and is stored with cluster 11 in block 526. The memory system assumes that, because cluster 12 is sequential to cluster 11 and the host has not indicated otherwise, that cluster 12 belongs to the same file as cluster 11. Next, a FAT sector is sent by the host with an entry for cluster 10. The entry for cluster 10 includes a pointer to the next cluster for the file of cluster 10 (file C). In this case the pointer indicates that the next cluster of file C is cluster 13. Then, when cluster 13 is received, even though it is logically sequential to the last cluster received (cluster 12) the memory system knows that cluster 13 is allocated to file C and so the sectors of cluster 13 are stored in block 522 with the sectors of cluster 10.

The following table summarizes the notification scheme for identifying file allocation of data of the above examples.

| Logical Sequence | File Sequence | Notification Signal |
| --- | --- | --- |
| Sequential | Same file | None |
| Sequential | New file | Host sends directory sector indicating first cluster of new file |
| Sequential | Different file | Host sends new FAT sector with entry for last cluster of file pointing to next cluster |
| Jump | Same file | Host sends new FAT sector with entry for last cluster of file pointing to next cluster OR None |
| Jump | New file | Host sends directory sector indicating first cluster of new file |
| Jump | Different file | Host sends new FAT sector with entry for last cluster of file pointing to next cluster |

In addition to the above signals indicating the file to which a cluster is allocated, the host may send an indication that a cluster is the last cluster of a particular file by a FAT sector including an End of File entry for the cluster. This allows the file to be closed and allows the memory system to carry out reclaim operations on the blocks containing the file as described below.

Memory Operation

In one example, when a file is closed by a host, the metablocks containing the file data are then marked as ready for reclaim operations. The techniques used to reclaim memory space in a memory system using techniques of the present invention are similar to those described in the Direct Data File Storage applications. In particular, when a file is closed there may be one or more metablocks that are full of data from the file but there is usually one metablock that is only partially filled with data from the file. In order to more efficiently store these residual file data the host may copy residual file data from one file to a metablock that contains residual file data from another file. Which residual file data are moved and the destination to which they are moved are chosen to keep the amount of unused memory space small. Thus, if a file is closed leaving residual file data occupying 30% of a metablock, the memory system will look for a metablock containing residual file data occupying 70% (or nearly 70%) of a metablock. A metablock containing portions of data from more than one file may be considered a common block. While direct data file storage techniques may be combined with techniques of the present application, embodiments of the present invention generally use logical addresses to manage data within the memory array, not file identifiers as used in direct data file storage.

In another example, a memory system according to an embodiment of the present invention stores files in one or more dedicated metablocks and one common block in the memory array so that when the file is no longer needed by the host, the dedicated metablocks may be erased immediately for reuse and the common block may be scheduled for garbage collection. Directory and FAT information sent by the host generally indicates when the host has deleted a file by removing the Directory entry for that file. In some cases, FAT entries may reflect this deletion. A memory system may determine from the directory that a file has been deleted by the host and therefore, any metablock containing only data from that file may be erased. Such a metablock may be added to a queue of metablocks to be erased at this point as part of ongoing reclaim operations. Similarly, a common block containing data from the file may be added to a queue of metablocks to be garbage collected so that the space occupied by obsolete data can be reclaimed. When the memory system has information regarding the host's deletion of files and those files are stored in metablocks in a contiguous manner with many metablocks containing data from only one file, reclaim operations may be scheduled in an efficient manner. Examples of such scheduling are given in U.S. patent application Ser. No. 11/259,423, entitled "Scheduling of reclaim operations in non-volatile memory," filed on Oct. 25, 2005.

One advantage of a notification scheme based on FAT and directory sectors is that it uses signals that are already in general use in an LBA interface. The FAT and directory sectors are sent at different times compared with many prior systems, but they contain valid information and are generally compatible with prior LBA interfaces. Thus, a host using a notification scheme according to an embodiment of the present invention would be compatible with a memory system that did not use such a notification scheme. Such a memory system would store the FAT and directory sectors without using them to determine where sectors of host data were stored. FAT sectors stored in this way are valid because they contain entries for clusters of data that have already been stored. Thus, in the case of an unexpected loss of power, the FAT data stored in the nonvolatile memory will not be in error. The incomplete nature of the FAT information for a file may indicate that the memory system had not completed storing data for that file when power was lost.

While the examples given above use sectors of control data (FAT and directory) to send allocation information, other information may also be sent by a host using signals that are compatible with existing logical interfaces. Sending two or more identical FAT sectors may indicate subsequent host behavior to a memory system. In one example, a host may indicate to a memory system that the host does not require immediate access to the memory system and that power will be maintained. This may be indicated by sending duplicate FAT sectors in succession. Only one of these sectors may be written by the memory system, or both may be written. In response to receiving duplicate FAT sectors, the memory system determines that power will be maintained and the host does not require any immediate access, so the memory system may enter an idle state. In an idle state, the memory system may perform housekeeping operations such as reclaim operations to garbage collect metablocks containing obsolete data and consolidate metablocks containing unwritten portions. An idle state is terminated by receipt of another host command. The memory system may indicate a busy status to the host while carrying out housekeeping operations in idle mode. A busy status indicator informs the host that the memory system is carrying out housekeeping operations, but does not prevent the host from sending a command to terminate housekeeping operations and start executing the new command. In another example, a host may indicate an imminent power-down by sending an identical FAT sector three times. The memory system may react to such a signal by entering a shut-down state. In this state, the memory system indicates a busy status to the host until it has stored any data in nonvolatile memory that was not yet stored and performed any other operations to make it safe to power down. The host waits until the memory system is no longer busy before removing power. Other host behavior may also be indicated by a host by sending multiple identical FAT or directory sectors. A host may also identify a particular file for deletion using repeated sectors of control information. When a memory system receives an indication from a host that a particular file should be deleted, the file is put in a queue for garbage collection. Similarly, a host may identify a particular file for erase using repeated sectors of control information. When a memory system receives an indication from a host that a particular file should be erased, the memory system puts the file in a queue for garbage collection and immediately proceeds to perform garbage collection to remove all the data of the file from the nonvolatile memory array.

Where a memory system has the capability to use notification signals but is connected to a host that does not provide such notification signals, the memory system determines that the host does not provide notification signals and then stores data in a manner that does not require such signals. The memory system may make this determination when it first receives communication from a host. For example if the memory system receives sectors of data to be written without any prior FAT or directory sectors, then the memory may determine that the host is not enabled for such signals and may select a data storage scheme that ignores the file allocation of sectors in choosing where to store them. In one example an "identify drive" command from a host allows a host to determine whether a memory system is capable of using notification signals. The memory system returns information in response to an "identify drive" command that includes whether it has this capability. A default data storage scheme for use by a memory system connected to a host that does not support notification signals may store data as shown in FIG. 7 without regard to the file allocation of a particular sector. Examples of such storage schemes are provided in U.S. patent application Ser. No. 10/750,155, filed on Dec. 30, 2003; Nos. 10/917,888; 10/917,867; 10/917,889 and 10/917,725, filed on Aug. 13, 2004.

In another embodiment, a notification scheme may not be limited to communication according to an existing interface. Additional commands, not complying with an existing interface, may be defined for providing allocation information from a host to a memory system. Hosts and cards using such additional commands generally require a hand-shaking routing when first connected so that they can identify that the use of such additional commands is possible. In general, hosts and cards capable of using such additional commands will also be capable of operating without additional commands when connected to a host or card that does not have the capability to use the additional commands. Thus, backward compatibility is maintained for memory systems and hosts using any such new commands. Additional commands may also be provided that are not related to conveying file allocation information. For example, an explicit command may be defined for a host to erase or delete a particular file.

Although the various aspects of the present invention have been described with respect to exemplary embodiments thereof, it will be understood that the present invention is entitled to protection within the full scope of the appended claims.

The invention claimed is:

1. A method of storing sectors of data from a plurality of files in a non-volatile memory array, sectors of each of the plurality of files mapped to a common logical address space by a host, comprising:
   receiving file allocation information from the host that indicates a file to which a sector of host data is allocated;
   subsequently receiving the sector of host data from the host for storage in the non-volatile memory array; and
   subsequently storing the sector of host data in the non-volatile memory array in a physical location that is determined according to the file to which it is allocated according to the file allocation information from the host, such that the sector is stored in an erase block that is dedicated exclusively for storage of sectors from the file, the erase block storing sectors of the file having discontinuous logical address ranges.

2. The method of claim 1 wherein the file allocation information from the host includes a sector of File Allocation Table information.

3. The method of claim 2 wherein the sector of host data is in a cluster of sectors and the sector of File Allocation Table information includes a File Allocation Table entry pointing to the cluster.

4. The method of claim 1 wherein the file allocation information from the host includes a sector of directory information containing an entry for the file.

5. The method of claim 1 wherein subsequent to storing the sector of host data, additional information is received from the host indicating that the sector is the last sector in the file and in response the file is closed and scheduled for reclaim.

6. The method of claim 1 further comprising receiving two or more identical sectors of control data from the host and in response carrying out reclaim operations while providing a status indicator to the host.

7. The method of claim 1 further comprising receiving two or more identical sectors of control data and in response preparing the memory array for a loss of power.

8. A method of storing sectors of host data from a host file in a non-volatile memory array having a metablock as the minimum unit of erase, sectors from the host file and other files mapped to a common logical address space, comprising:
   receiving a first plurality of sectors of data of the host file, the first plurality of sectors occupying a first portion of the logical address space;
   subsequent to receiving the first plurality of sectors, receiving a second plurality of sectors that are not of the host file, the second plurality of sectors occupying a second portion of the logical address space;
   subsequent to receiving the second plurality of sectors, receiving a third plurality of sectors of the host file, the third plurality of sectors occupying a third portion of the logical address space, the first portion of the logical address space and the third portion of the logical address space being logically discontinuous;
   in response to information identifying the first and third portions of the logical address space as allocated to the host file, storing the first plurality of sectors and the third plurality of sectors in a first metablock of the memory array;
   storing the second plurality of sectors in a second metablock of the memory array
   wherein the first metablock is dedicated to storing data of the host file; and
   wherein the information is received prior to receiving the first plurality of sectors of data of the host file.

9. The method of claim 8 wherein the first and third portions of the logical address space are identified as allocated to the host file by directory and File Allocation Table sectors sent by the host.

10. The method of claim 8 wherein the second portion of the logical address space extends from the first portion of the logical address space to the third portion of the logical address space, further comprising: prior to receiving the second plurality of sectors, receiving a directory sector indicating that a first cluster of the second plurality of sectors is not allocated to the host file.

11. The method of claim 10 further comprising: prior to receiving the third plurality of sectors, receiving a File Allocation Table sector indicating that a first cluster of the third plurality of sectors is allocated to the host file.

12. A method of storing a host data file in a non-volatile memory array that has a metablock as the minimum unit of erase, comprising:
   receiving file allocation information regarding a first plurality of sectors of a host data file prior to receipt of any sectors of the host data file, the file allocation information identifying the sectors of the first plurality of sectors as belonging to the host data file;
   subsequently receiving the first plurality of sectors of data of the host data file, each of the first plurality of sectors having a logical address from a logical address space defined for the memory array, the first plurality of sectors having logical addresses that occupy two or more discontinuous portions of the logical address space;
   receiving a second plurality of sectors of data that are not of the host data file, each of the second plurality of sectors having a logical address from the logical address space, the second plurality of sectors received interspersed with the receipt of the first plurality of sectors;
   in response to determining that the two or more discontinuous portions of the logical address space are occupied by data of the host data file, storing the data from the two or more discontinuous portions of the logical address space in a metablock that contains only data of the host data file.

13. The method of claim 12 wherein the file allocation information is in the form of File Allocation Table and directory sectors.

14. The method of claim 12 further comprising receiving end of file information indicating the logical address of the end of the host data file and in response closing the host data file and scheduling the host data file for garbage collection.

15. A method of interfacing a memory system with a host that allocates sectors of host data files to a common logical address space, comprising:

the memory system receiving a plurality of sectors of host data from the host, the plurality of sectors allocated to a host file, the plurality of sectors of host data having logical addresses assigned by the host that are not contiguous; and the memory system determining whether the plurality of sectors are allocated to the host file and, in response to determining that the plurality of sectors are allocated to the host file, the memory system storing the plurality of sectors in an erase block that stores only data of the host file; and wherein the memory system determines whether ones of the plurality of sectors are allocated to the host file using file allocation information received from the host prior to receipt of the plurality of sectors of host data from the host.

16. The method of claim 15 wherein the file allocation information that is received from the host includes one or more File Allocation Table sectors.

17. The method of claim 15 wherein the file allocation information that is received from the host includes one or more directory sectors.

18. The method of claim 15 wherein the memory system further determines that the end of the host file has been received and in response closes the file and schedules the file for garbage collection.

* * * * *